United States Patent Office 2,962,430
Patented Nov. 29, 1960

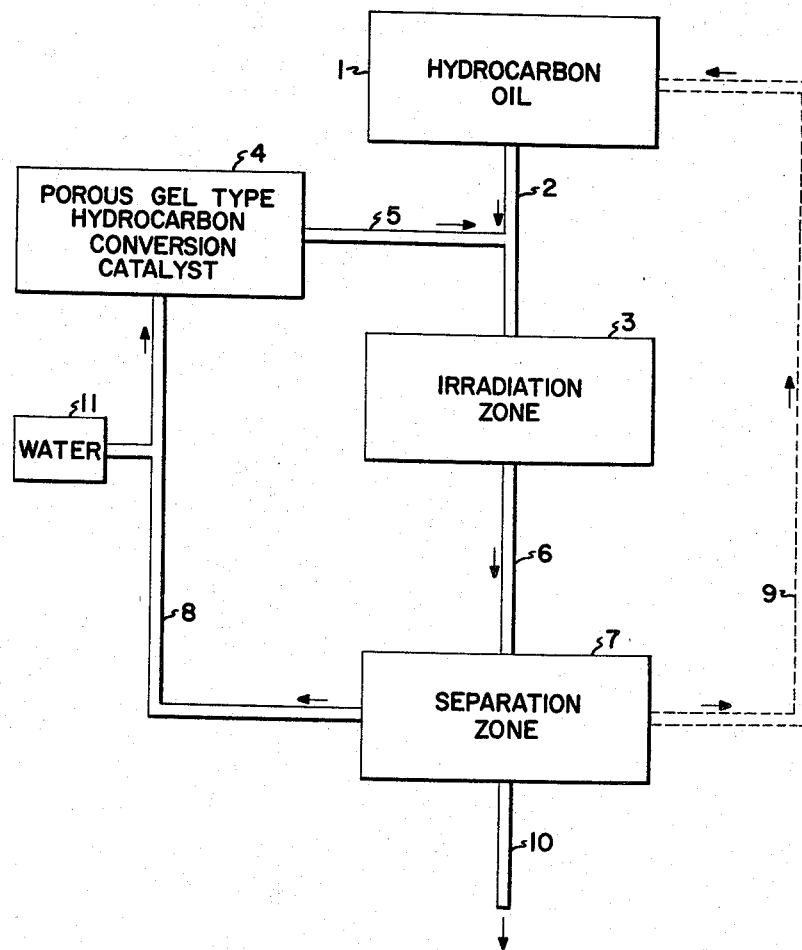
John P. Longwell
Peter J. Lucchesi  Inventors
Robert B. Long
By L. A. Strumbeck Attorney

2,962,430

CATALYTIC HYDROCARBON RADIOCHEMICAL CONVERSION PROCESS

John P. Longwell, Scotch Plains, Peter J. Lucchesi, Cranford, and Robert B. Long, Wanamassa, N.J., assignors to Esso Research and Engineering Company, a corporation of Delaware Filed June 21, 1956, Ser. No. 592,984

6 Claims. (Cl. 204—154)

This invention relates to hydrocarbon radiochemistry. It is particularly concerned with the conversion of hydrocarbon oils in liquid phase by irradiation in the presence of a gel type hydrocarbon conversion catalyst containing adsorbed water.

In brief compass, this invention proposes an improved hydrocarbon radiochemical conversion process which comprises converting a hydrocarbon oil in liquid phase in a reaction zone by irradiation with high intensity ionizing radiation, especially with gamma rays, in the presence of a highly porous, solid gel type, hydrocarbon conversion catalyst, e.g., silica-alumina, containing at least 5% adsorbed water.

In especially preferred embodiments of the invention, the conversion temperature is maintained below 500° F., the radiation is obtained from a nuclear reactor, and a distillate petroleum oil is converted.

It has now been found that the presence of adsorbed water on the surface of a highly porous, gel type, hydrocarbon conversion catalyst greatly influences the amount and type of products obtained when the catalyst is used in a hydrocarbon conversion process brought about by gamma or neutron irradiation. The intimate contact of the water with the surface of the catalyst and with the oil being converted, has an appreciable effect on the outcome of the conversion.

To obtain best results, it is much preferred to maintain the conversion temperature below 500° F., and to maintain a pressure sufficient to assure substantially liquid phase conditions.

The feed stocks amenable to the present invention include normally liquid hydrocarbon oils, such as whole crudes, distillates and residua therefrom, asphalts, shale oils, coal tars, synthetic oils, and the like. Especially good results are obtained with relatively clean distillate petroleum oils having a boiling point in the range of $C_4$–1050° F.

The preferred catalyst used in the present invention is a gel type hydrocarbon conversion catalyst known in the art, useful in such hydrocarbon conversion processes as gas oil cracking, naphtha reforming, polymerization and desulfurization. An example of a gel type catalyst is the solid derived from the drying of a hydrated oxide of such materials as alumina, silica, zirconia, titania, magnesia, zinc aluminate, and mixtures thereof. Other known types of porous conversion catalyst such as, activated charcoal, can however be used.

The porous hydrocarbon conversion catalyst can be derived from natural sources such as from bauxite, or can be manufactured such as by the alcoholate alumina method or by precipitation from an aluminum sulfate solution. One familiar type of catalyst is the silica-alumina catalyst used for gas oil cracking.

These catalysts preferably are highly porous and have a surface area over 50 $m.^2$/gm. and a pore volume greater than 0.2 $cm.^3$/gm. These properties may be imparted by known methods such as calcining, chemical treatment, rate of precipitation, and similar methods. The catalysts preferably have a size in the range of 0 to 1000 microns, although larger sized particles can be used, such as pills or compactions.

In preferred embodiments of the invention, the gel catalyst carries an added component. This can be a conventional component affecting the conversion such as a hydrogenating component, e.g. the elements, oxides, or sulfides of platinum, molybdenum, palladium, nickel, rhodium and ruthenium; or can be added to improve properties of the catalyst such as silica, or salts or oxides of potassium, calcium and magnesium. The added component can also include what might be termed "radiochemical accelerators" such as boron 10 and lithium 6 which give off high intensity alpha particles upon capture of a neutron; or materials which emit high intensity gamma rays upon neutron capture, e.g. cadmium, or which emit beta rays upon neutron capture. These materials can be used as pure elements or isotopes, or as compounds. While preferably they are impregnated on the surface of the catalyst, they can be carried on inerts or be used in solutions, e.g., tri-n-dodecyl-borate can be used.

The following explanation of the drawing attached to and forming a part of this specification will serve to make this invention clear.

In the drawing, feed from source 1 is passed by line 2 to a radiation zone 3. The water-containing catalyst of this invention from source 4 is admixed with the oil by line 5. The catalyst containing oil is exposed to irradiation in radiation zone 3.

The radiation can be obtained from waste materials from nuclear reactors such as spent fuel elements, or from artificially produced isotopes such as cobalt 60. In this form of the invention, the reactants are simply flowed past the radiation source in suitable conduits or containers. The intensity of the radiation source is preferably such that the reaction zone is under a gamma flux of at least about $10^5$ roentgens/hr. The conditions are such, preferably, that the oil receives a dosage of at least $10^3$ roentgens.

It is much preferred, however, to carry out the conversion within a nuclear reactor such as an atomic pile. The reactant stream containing the catalyst is passed through the reactor or around the fissionable material in suitable pipes, being exposed thereby to high intensity ionizing radiation comprising gamma and nutron radiation. Moderators such as carbon, light or heavy water, or hydrocarbons can be employed. In some cases the feed stream itself can serve as a moderator.

When using a nuclear reactor, besides the above level of gamma radiation, it is preferred that the reaction zone be exposed to a neutron flux of at least $10^8$ neutrons/$cm.^2$/sec., and that the conditions be such that the reactants receive a neutron dosage of at least $10^4$ ergs/gm./sec.

A suspensoid system is shown in the drawing, i.e., the catalyst is carried through the reaction zone suspended in the liquid reactant, and then recovered and recycled. However, the catalyst can exist in the radiation zone 3 as a fixed, gravitating or fluid bed. It can be continuously removed from radiation zone 3, either with the reactant or separately, for purposes of regeneration, retreatment, or the like. It can, if desired, be periodically or continuously regenerated in place in radiation zone 3.

The conditions within radiation zone 3, as indicated previously, preferably are sufficient to maintain liquid phase conditions and the temperature is maintained below 500° F. to obtain good product distribution. The pressure can range as high as 100 p.s.i. or better. The time necessary to attain the above dosages is usually in the range of 60 to $10^6$ min. The flow rate is normally in the range of 0.01 to 100 v./v./hr. The catalyst/oil ratios lie in the range of about 0.1 to 10.

The irradiated material is transferred from zone 3 by line 6 to separation zone 7. The separation zone comprises means for recovering the catalyst such as distillation and filtration. The recovered catalyst in this example is recycled by line 8, although it can be discarded. The recovered catalyst can be first treated as by burning, steaming, chemical treatment, etc. to remove contaminates and improve its properties before being recycled.

Separation zone 7 can also include means for removing and/or neutralizing radioactive waste products. Such means may include storage tanks to permit decay of radioactivity, ion exchange apparatus, distillation columns, and solvent extraction units.

The hydrocarbon products are also separated in zone 7 by conventional means. Thus, distillation, extraction, crystallization, and adsorption, can be used. If desired, a portion of the product can be recycled by line 9. The treated product is removed by line 10.

According to this invention, the catalyst used in radiation zone 3 contains at least 5% adsorbed water, preferably over 25%. In the suspensoid system shown, this water is maintained on the catalyst by adding water from source 11 to the recycled catalyst. This can be added by any convenient method such as by soaking the catalyst or spraying it. When the catalyst is essentially permanently maintained, say as a fixed bed, in zone 3, the water content of the catalyst can be maintained by adding water to the feed, or injecting water directly into the catalyst containing zone, preferably in amounts greater than 2 wt. percent based on feed. This may be done periodically or continuously.

In some cases the adsorption of water on the catalyst can be favored by the use of certain materials such as $CaSO_4$ and other anhydrous salts which are easily hydrated. These can be carried on the surface of the catalyst, or can be added with the water.

EXAMPLE

The following oils were treated:
Oil A: A 250/500° F. hydrogenated kerosene having an aniline point of about 145, a gravity of 45.9° API and a refractive index at 20° C. of 1.4407.

Oil B: A petroleum virgin paraffinic gas oil having the following inspections: Gravity of 30.7° API, bromine No. of 1.25 centigrams/gram, 34.4 SSU viscosity at 210° F., viscosity index of 67, and 0.14 wt. percent sulfur content. The distillation characteristics were 5% off at 600° F. and 90% off at 700° F. at atmospheric pressure.

Oil C: A West Texas light residuum having an initial boiling point of 543° F. and 50% cut point of 950° F. Its density is 20.9° API, refractive index is 1.5162, and sulfur content is 2.53%. The residuum contains 10.1 p.p.m. Ni, 24.4 p.p.m. V, 2.96 p.p.m. Fe. The oil has a C/H ratio of 7.43. The catalysts used were alumina, silica-alumina, and platinum of alumina.

Alumina catalysts: An excess of ammonia water was added to an aluminum alcoholate solution. The aqueous layer containing the alumina hydrosol as a slurry was separated. The slurry was dried at 250° F. and calcined at 1100° F. for 4 hours. The product had a surface area of 100-200 m.$^2$/gm.

Silica-alumina catalysts: A silica-hydrogel was soaked in an aluminum sulfate solution and then treated with ammonia followed by washing free of sulfate. The product was dried and calcined at 1200° F. for 3 hours. It had a surface area of about 500 m.$^2$/gm.

Platinum on alumina: This was a commercially available alcoholate alumina catalyst containing 0.6 wt. percent platinum and 0.6 wt. percent chlorine known as Davison type 1000. The catalyst was in the form of $3/16$ x $1/8$ inch cylinders having a surface area of 300 m.$^2$/gm. and a pore size of 50 to 80 A. These catalysts were impregnated with water by adsorbing a known weight of water on a known weight of previously dried catalyst.

The air cooled, natural uranium, graphite moderated research reactor of the Brookhaven National Laboratories was used to irradiate these samples. This pile was operating at a total power of 24 megawatts at the time of these experiments which gave the following flux distribution at the point where the oils were irradiated:

Slow neutron flux (.03 ev.)=$2.5 \times 10^{12}$ neutrons/cm.$^2$/sec.
Fast neutron flux (>1 mev.)=$0.5 \times 10^{12}$ neutrons/cm.$^2$/sec.
Gamma intensity=$1.7 \times 10^6$ roentgens/hr.

The core of the reactor was approximately a 20 ft. x 20 ft. x 20 ft. lattice of graphite with horizontal one-inch diameter aluminum-clad uranium rods spaced evenly throughout the reactor extending from the north to south faces of the core. This core was completely surrounded by 5 ft. of concrete shielding. The sample holes used for irradiation were horizontal 4-inch x 4-inch square holes extending through the 5 ft. concrete shield and into the carbon core for a distance of 10 ft. from the core face. Normal operating temperatures in the experimental hole were from 250° to 400° F.

The irradiations were carried out as follows:

Three one-quart samples were irradiated at one time by placing them in three vented 3-inch diameter aluminum containers which were mounted on a horizontal aluminum sled. The vents of aluminum tubing extended from the vapor space in the containers out of the core and through the shielding to a sample receiver system where gases and condensable liquids could be metered and collected. The samples were prepared by adding the solids to the container to fill it, evacuating the void space in the container, and sucking the oil into the container with the vacuum. The samples were then purged with purified nitrogen, inserted in the pile during scheduled shutdowns, irradiated for periods of ten days, and withdrawn from the pile during the following shutdown.

Table I gives the ratio of $CH_3$ to $CH_2$ groups in the products from irradiation of Oil A.

Table I

| Boiling Range of Product, ° F. | 27% $H_2O$ On Alumina | No Catalyst | Pt |
|---|---|---|---|
| 0/275 | 1.52 | | |
| 275/340 | 1.28 | | |
| 340/00 | 1.01 | | |
| 0/430 | | | 0.80 |
| 430/00 | | 0.64 | |

Table I shows that the products obtained from hydrogenated kerosene in the presence of water are highly branched and contain a high concentration of iso structures. $CH_3/CH_2$ was measured by nuclear magnetic resonance.

Table II shows that irradiation in the presence of a catalyst containing adsorbed water has the specific effect of producing highly unsaturated cracked material, as evidenced by the high bromine numbers.

Table II

| | Oil B | | Oil C | |
|---|---|---|---|---|
| Temperature, °F | 350/400 | | 350/400 | |
| Pressure, p.s.i | atmospheric pressure | | | |
| Time, days | 10 | | 10 | |
| Catalyst | Si/Al[1] | | Si/Al[1] | |
| Catalyst/Oil Vol. Ratio | 1 | | 1 | |
| Initial Water on Catalyst | None | 20% | None | 20% |
| Conversion to Gas, wt. percent | | 7.9 | 1.2 | |
| Products: | | | | |
| Boiling Point | 0/430 | | 0/600 | |
| Wt. percent on Feed | | | 8.0 | 2.6 |
| Aromatics, Vol. percent | 14.8 | 9.4 | 24.1 | 21.8 |
| Olefins, Vol. percent | 12.3 | 35.9 | 30.4 | 42.7 |
| Saturates, Vol. percent | 72.9 | 54.7 | 45.5 | 37.5 |
| Bromine No | 3.05 | 29.0 | 31 | 36 |
| Boiling Point | 430/650 | | | |
| Wt. percent on Feed | | | | |
| Aromatics, Vol. percent | 8.8 | 9.4 | | |
| Olefins, Vol. percent | 34.6 | 50.6 | | |
| Saturates, Vol. percent | 56.6 | 40.0 | | |
| Bromine No | 1.03 | 27.0 | | |

[1] Silica-Alumina.

NOTE.—The water layer from irradiation of oil B and water mixture showed a metals content corresponding to 36% removal of Fe and some removal of V and Ni from the residuum.

It has also been found that the presence of water on the catalyst is responsible for the production of a substantial amount of oxygenated organics (acids, esters, ketones) at these low temperatures. By infra-red analysis, it was found that while the feed streams contained no oxygenated hydrocarbons, the various product fractions contained substantial amounts of oxygenated compounds.

More particularly, the 0/600° F. product (about 13% on feed) from the irradiation of Oil A with the alumina catalyst containing 27% water, showed by infra-red analysis about 20% carbonyl compounds. These carbonyl compounds were not observed in blank runs without water. Analysis of the 0/600° F. product (about 10 wt. percent on feed) from irradiation of Oil B using a catalyst comprising alumina and 27 wt. percent water also showed about 20% carbonyl compounds, with none being obtained in blank runs.

Having described this invention, what is sought to be protected by Letters Patent is succinctly set forth in the following claims.

What is claimed is:

1. An improved hydrocarbon radiochemical conversion process which comprises converting a hydrocarbon oil in liquid phase in a reaction zone by irradiation in the presence of a highly porous hydrocarbon conversion catalyst containing at least 5% adsorbed water, said reaction zone being irradiated with radiation consisting of gamma rays having an intensity above $10^5$ roentgens/hr. and neutrons at a flux of at least $10^8$ neutrons/cm.$^2$/sec.

2. The process of claim 1 wherein said catalyst comprises alumina having a surface area above 50 m.$^2$/gm.

3. The process of claim 1 wherein the radiation is obtained from a nuclear reactor, the dosage received by said oil being at least $10^3$ roentgens.

4. The process of claim 1 wherein said hydrocarbon oil is a distillate petroleum oil boiling in the range of $C_4$ to 1050° F.

5. The process of claim 1 wherein the reaction temperature is maintained below 500° F.

6. The process of claim 1 wherein the process is continuous, the catalyst remains in said reaction zone, and the feed entering said reaction zone contains at least 2 wt. percent water.

References Cited in the file of this patent

UNITED STATES PATENTS

| | | |
|---|---|---|
| 1,338,709 | Sulzberger | May 4, 1920 |
| 2,350,330 | Remy | June 6, 1944 |
| 2,377,744 | Bailey | June 5, 1945 |
| 2,424,152 | Connolly | July 15, 1947 |
| 2,743,223 | McClinton et al. | Apr. 24, 1956 |
| 2,813,837 | Holden | Nov. 19, 1957 |

FOREIGN PATENTS

| | | |
|---|---|---|
| 665,263 | Great Britain | Jan. 23, 1952 |

OTHER REFERENCES

Davidson: "Jour. of Applied Physics," vol. 19, pages 427–433, May 1948.

Mincher: A.E.C. Document KAPL–731, pages 3–7, April 2, 1952, declassified February 15, 1955.